United States Patent
Halahmi

[19]

[11] Patent Number: 5,812,856
[45] Date of Patent: Sep. 22, 1998

[54] EFFICIENT ROM AND PLA RECODING TO SAVE CHIP AREA

[75] Inventor: Dror Halahmi, Tel Aviv, Israel

[73] Assignee: Motorola, Inc., Schaumburg, Ill.

[21] Appl. No.: 880,551

[22] Filed: Jun. 23, 1997

[51] Int. Cl.[6] .................................................. G06F 9/00
[52] U.S. Cl. ................................. 395/709; 364/153
[58] Field of Search ................. 395/709; 711/170; 364/468.03, 468.28, 148, 153

[56] References Cited

U.S. PATENT DOCUMENTS

| | | | |
|---|---|---|---|
| 4,763,255 | 8/1988 | Hopkins | 395/709 |
| 4,773,007 | 9/1988 | Kanada | 395/709 |
| 5,247,668 | 9/1993 | Smith | 395/708 |
| 5,274,818 | 12/1993 | Vasilevsky | 395/709 |
| 5,555,417 | 9/1996 | Odnert | 395/709 |
| 5,734,908 | 3/1998 | Chan | 395/709 |
| 5,752,035 | 5/1998 | Trimberger | 395/705 |

*Primary Examiner*—Eric Coleman

[57] ABSTRACT

DSP size and cost can be reduced by shrinking the program ROM and opcode interpreter (e.g., PLA) to store and recognize only #OC unique opcodes from within the total available opcodes for the DSP. The minimum opcode length M is the smallest integer satisfying $2^M \geq \#OC$. It is preferred to choose an opcode length M'>M so that the total chip area occupied by the ROM plus PLA is minimized without loss of chip performance. By converting 24 bit opcodes to 16 bit opcodes for M=12 and M'=16, the combined program ROM and PLA areas are reduced by ~⅓rd and the overall DSP is significantly smaller.

10 Claims, 1 Drawing Sheet

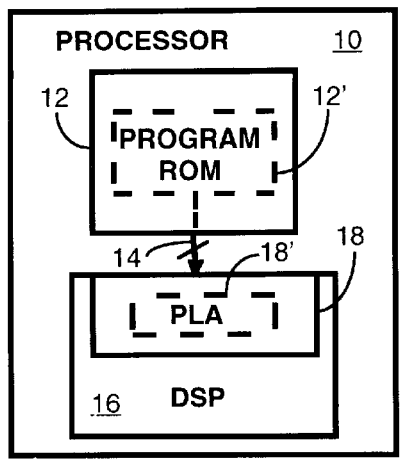
FIG. 1
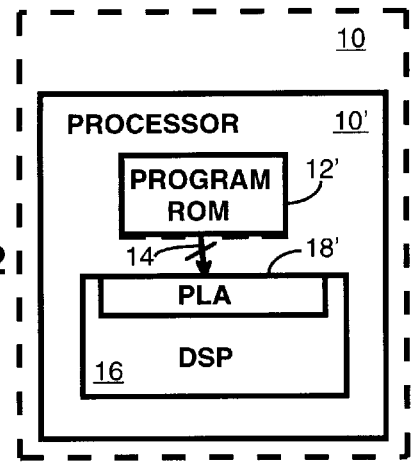
FIG. 2
| OPCODE NO. | 24 BIT OPCODE | 16 BIT OPCODE |
|---|---|---|
| 0 | 0000 0000 0000 0000 0000 0000 | 0000 0000 0000 0000 |
| 1 | 0000 0000 0000 0000 0000 1000 | 0000 0001 0000 1000 |
| ⋮ | ⋮ | ⋮ |
| 4093 | 1111 1000 0011 1001 0000 0000 | 1100 0101 0000 0000 |
FIG. 4
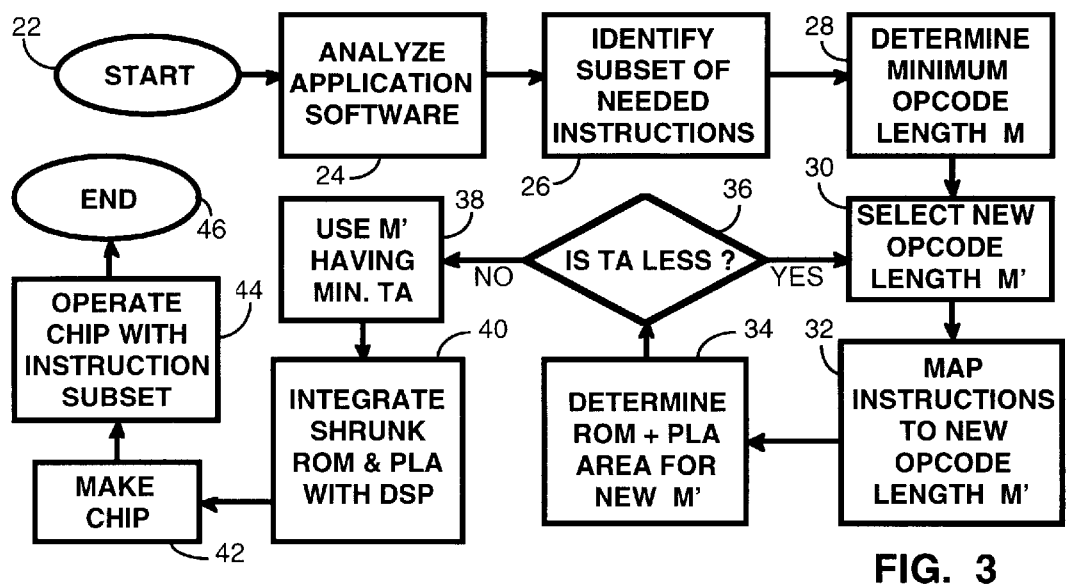
FIG. 3

EFFICIENT ROM AND PLA RECODING TO SAVE CHIP AREA

FIELD OF THE INVENTION

This invention concerns more efficient programming and interpretation of microprocessor instruction sets to minimize microchip area and improve operation.

BACKGROUND OF THE INVENTION

An ongoing problem with all integrated circuits, especially digital signal processors (DSP) and other very complex circuits, is die cost. The words "die" and "microchip" are used here interchangeably to describe the integrated circuit (IC) semiconductor substrates in which a DSP or other system is fabricated.

It is well known that the larger the die area required to implement a given electronic function, the greater the cost For example, suppose the area of an individual IC die is such that 100 die will fit on a wafer which costs $120 to make, and that the manufacturing process has an 80% die yield. In this case, 80 good die are obtained from each wafer at a cost of about $120/80=$1.50 per die. Doubling the die area, reduces the number of possible die per wafer by half to about 50 possible die per wafer. But, larger die have a lower yield, e.g., 50% versus 80%, so that now there are only 25 good die per wafer. Since the wafer cost is approximately constant, the larger die cost about $120/25=$4.80 each, more than 3 times as much. The steep relationship between die area and die cost places a great premium on reducing die area without any performance penalty. Thus, such improvements continue to be sought.

It a purpose of this invention is to provide means and methods as recited in the claims which overcome, in whole or part, these and other deficiencies or limitations of the prior art, especially in making it possible to achieve smaller IC area.

BRIEF DESCRIPTION OF THE DRAWINGS

FIGS. 1–2 are simplified schematic layout diagrams of an integrated circuit (IC) processor chip before and after applying the present invention;

FIG. 3 is a simplified flow chart according to a preferred embodiment of the present invention; and FIG. 4 is a simplified mapping table showing, by way of example, the conversion of 24 bit opcodes to 16 bit opcodes for the processor.

DETAILED DESCRIPTION OF THE DRAWINGS

FIGS. 1–2 are simplified, schematic layout diagrams of integrated circuit (IC) processor 10, 10' having program ROM 12, 12' coupled by bus 14 to digital signal processor (DSP) 16 which includes program logic array (PLA) 18, 18'. The unprimed and primed reference numbers illustrate schematically, the die area occupied by a particular function, before (unprimed) and after (primed) application of the present invention.

FIG. 1 shows schematically that the die areas of Program ROM 12, 12' and PLA 18, 18' are shrunk and FIG. 2 shows schematically how the smaller areas of program ROM 12' and PLA 18' allow the overall area of processor 10' to be smaller than for unmodified processor 10. This die area reduction is obtained by tailoring the program opcodes stored in ROM 12' and providing correspondingly modified PLA 18' needed to interpret the stored opcodes to particularly match the application program intended to be run by processor 10, 10'.

DSP 16 has a predetermined set of available logic instructions. While the label "DSP" is used herein for convenience of explanation, those of skill in the art will understand that the present invention is not limited to digital signal processors but applies to any type of digital processor or microprocessor. Thus, the terms DSP is intended to include any kind of programmable digital computer or processor able to operate from a fixed program store, e.g., a read-only memory (ROM). As used herein, the abbreviation "ROM" is intended to include any form of read-mostly memory, as for example but not limited to, EPROM, EAROM, EEPROM and other non-volatile memory well known in the art, where the size of the memory need not be altered after the die is manufactured General purpose processors, including processor 10, can be used to run software which is substantially fixed and built into program ROM 12. The data on which this program operates can vary, but the program stored in ROM 12 remains unchanged after manufacture or is of the same size and employs the same instruction subset. This invention concerns minimizing the amount of chip area required to store and carry out such substantially fixed programs.

ROM programming is often done for convenience in a high level language, but such high level language is generally not directly useful to processor 10, 10'. At some stage in the programming process, the concatenated stream of program instructions making up the program intended to be carried out by processor 10, 10' are converted into operation code ("opcode") words which are stored in program ROM 12, 12', usually in the order in which the program is to be executed. A particular opcode can be used multiple times in a given program. ROM 12, 12' can be integrated on the same chip with DSP 16 or on a separate chip or both. In the preferred embodiment, ROM 12, 12' and DSP 16 with PLA 18, 18' are located on the same chip. Opcodes are often referred to as "instruction words".

The opcodes are a sequence of 1's and 0's (e.g., see FIG. 4). Each opcode word tells DSP 16 to perform a primitive operation corresponding to an instruction available in the instruction set of the particular DSP being programmed, e.g., MAC, MOVE, ADD, etc. Every processor has its own set of primitive instructions. The opcodes are the machine level equivalents of this instruction set, and the opcode sequence is, generally, the machine level version of the program instruction sequence. The opcodes have a predetermined structure and length. For example, the Motorola DSP56602, a present day DSP, has 24 bit opcodes which permit a very large number of program steps to be provided and very complex programs to be carried out.

PLA 18 receives the opcodes from ROM 12, decodes them and issues instructions to the various registers, adders and accumulators in the DSP to cause them to execute the operation defined by each opcode. ROM's, DSP's and PLA's are individually well known in the art. As used herein the term "program logic array" and the abbreviation "PLA" are intended to include any interpreter having at least a portion which is fixed (e.g., hard-wired) for a given DSP and which translates the instructions (e.g., the opcode words) provided from the program store (e.g., program ROM 12, 12') to activate elements of the DSP to perform operations corresponding to one or more of the instruction in the basic instruction set. In some cases, various elements of the DSP can be coupled in parallel with the PLA so that they can react to a particular opcode instruction without waiting for the PLA (or other interpreter) to completely decode the instruction word.

It is often the case, that the application program that is built into ROM 12 uses a subset A of the processor's full instruction set C while the remaining instructions (subset B) are never used by that application program. For proper operation, processor 10 must support subset A, but lack of support for subset B will not have an adverse affect on the operation of the DSP or processor in that application. When this is true, then subset A can often be encoded in fewer bits than are needed for the full instruction set A+B.

The size, complexity and chip area occupied by ROM 12 depends upon the number of program instruction steps in the program and on the instruction (opcode) word length. In this invention, it is presumed that the number of program instruction steps stays substantially the same, although this is not essential. Thus, by shortening the opcode length, ROM area can be reduced, without any change in the number of program instruction steps.

The size, complexity and chip area needed by PLA 18 depends on the number of unique opcodes (instructions) what the PLA must decode and the number of bits available to code the instructions. By restricting the number of different opcodes that the PLA is required to interpret, the PLA can often be made less complex and PLA area can be reduced. However, for best overall results, it is desirable to select the opcode length to optimize the total area (TA) of the PLA and ROM considered together (and also the overall chip area), since the opcode length for minimum TA does not always correspond to the opcode lengths which independently minimize the ROM and PLA areas.

For example, some application programs executed by the DSP56602 use about ~$10^4$ program instruction steps made up of about ~$10^3$ different opcodes. If ~$4\times10^3$ different opcodes are needed, these can be encoded using 12 bit opcodes. The remainder of the 24 bit opcodes normally available for the DSP56602 are unused and not needed for such an application. By eliminating the unneeded opcodes, the required ROM space can be dramatically reduced, thereby saving die area. Further, PLA 18 which interprets the opcodes provided by program ROM 12 no longer needs to deal with all of the 24 bit opcodes that are native to this DSP's instruction set. Thus, the PLA can sometimes also be simplified and shrunk, giving further die area saving.

FIG. 3 is a simplified flow chart according to a preferred embodiment of method 22 of the present invention. Method 22 begins with steps 24, 26 in which the particular application program to be run by DSP 18 is analyzed to determine which instructions are needed (subset A) and which are not needed (subset B) and the number of unique opcodes (#OC) that are needed. From this information, the minimum number M of opcodes bits that are needed to execute the application software are determined in step 28 as M=INT[(Ln #OC)/Ln 2)], where INT means to round the expression in the square brackets to the next largest integer. Stated another way, M is the smallest integer which satisfies the relation $2^M \geq$#OC. For example, if #OC=4093 opcodes are needed for instruction subset A, then [(Ln #OC)/Ln 2)]= 11.998942 and M=12, since 12 bit opcodes are sufficient, i.e., $2^{12}$ =4096>4093.

However, it is usually desirable in step 30 to choose an opcode length (i.e., number of bits) M' that is larger than the minimum opcode length M. There are several considerations that desirably enter into the choice of M'.

For M'>M, extra bits are available which can be dedicated to simplifying the design of the PLA. As M' increases relative to M, the PLA can be less complex and therefore occupy less die area. The operation of the DSP can be improved by using some of the additional bits available when M'>M to control certain operations. This is especially important for elements that cannot wait until the PLA has decoded the entire instruction word in order to begin operation.

For example, one of the extra bits available when M'>M can be used as a flag bit to activate or deactivate a specific element within the DSP (e.g., a multiplier or accumulator or comparator, etc.), thereby saving decode time for that element and/or allowing it to initiate a parallel operation before the instruction is fully decoded. In many DSP's certain elements receive the opcodes in parallel with the PLA, and can recognize a flag bit pertaining to their operation and begin functioning as soon as the instruction arrives rather than waiting until it is completely decoded. This is very useful.

The amount by which M'>M, that is, the number of extra bits that should be included, is conveniently determined by an iterative process illustrated by steps 30–36.

In step 30, a value M'=M+Δ with Δ=0, is conveniently used as an initial choice for M'. In step 32, the essential opcodes (subset A) are mapped to M' bits. FIG. 4 illustrates this mapping in the case of a 24 bit opcode processor being area optimized to handle a program requiring only 4093 unique opcodes, i.e., M=12 but with M'=16. In doing the mapping, it is desirable to preserve, insofar as possible, those fill bits in the original opcode set that are used as flags to control any elements needed for efficient operation of the application program.

In step 34, the total area (TA) needed for ROM 12' and PLA 18' is determined for the assumed value of M'. Persons of skill in the art will understand that it is the sum of the two area that is desired and that the new ROM and PLA areas can be determined individually in either order or at substantially the same time.

The result of step 34 is passed to query step 36 where it is determined whether the combined area of ROM 12' and PLA 18' for the current value of M' is smaller than for the previous value of M'. If the output of query step 36 is YES, then in step 30, Δ is incremented by 1, and steps 32, 34, 36 are repeated for the new value of M'. This continues for Δ=1, 2, 3 . . . $\Delta_L$, until for Δ=$\Delta_L$ the outcome of query step 36 is NO. Then in step 38, the value of M'=M+($\Delta_L$-1) corresponding to the smallest total area is selected, and in step 40, the corresponding shrunk ROM and PLA layouts are incorporated in processor 10. Other things being equal, it is usually the case, that the smallest total area (TA) for ROM 12' and PLA 18' also corresponds to the smallest TA for processor 10', but if that is not the case, then the value of M' corresponding to this smallest TA of the whole processor chip should be used.

Another consideration in selecting the optimum value of M' depends upon the architecture of processor 10, 10'. For example, if double word processing is permitted, i.e., a combination of an instruction word+data word, then it is desirable to select M'≥M to be the same length as the data word or some small multiple or submultiple thereof. For example, in the illustration presented above, M=12, but the DSP 56602 supports double length (opcode+data) operations with 16 bit data words. Thus, it is advantageous in this case to also have 16 bit opcodes, i.e., of the same length as the supported data word length.

More generally, it is preferred to select an opcode bit length M'=n×N where n and M satisfy the relationship $((n-1) \times N) \leq M < (n \times N)$ where N is a convenient unit operation word or nibble length in the processor for handling instructions or data and n is an integer. Values of N=2, 4, 8, 12, 16, etc. are commonly encountered.

By way of example, the DSP 56600 family can use N=8 bit instructions or data bytes so that, for #OC=4093 opcodes, a convenient opcode length M'=n×N=2×8=16 bits is preferred over the minimum required opcode length of M=12 bits. As noted above, this is also a data word length for double word operations. N can have other values depending upon the internal architecture of the processor to which the invention is being applied.

In step 40, the ROM and PLA shrinks are desirably integrated with the DSP in processor 10' which is fabricated in step 42 and operated in step 44 using means well known in the art. The process ends in step 46. The smaller die area occupied by shrunken ROM 12' and PLA 18' and, therefore, by processor 10' are shown schematically in FIGS. 1–2. In the example give above where 24 bit opcodes are replaced by 16 bit opcodes (e.g., see FIG. 4), the area saving is about ⅓rd for both the ROM space and the related PLA space. This provides a significant area reduction for the die of processor 10'. In this example, M'=M+Δ with Δ=4 preferred, but other values are also useful. In general, M' is usefully in the range 4–64, with 8–24 being more convenient and M'=16 being preferred. Stated another way, Δ is usefully in the range 1–12, with 1–8 being convenient and 2–4 being preferred.

Where an exiting processor is being area optimized, the process of providing a reduced opcode set is simplified because of the existence of the original opcode set and the structure that is usually inherent in such opcode sets. For example, certain fields in the opcodes are generally reserved to represent certain variables, instructions or parameters or to affect certain sub-units of the DSP. This structure should preferably be preserved in the reduced opcode set so as to simplify the redesign of the PLA, but this is not essential. For example, if bits 0–4 always address a certain hardware block of the DSP, then this relationship is desirably preserved. Other bits are reserved for specific functions. These hardware or function dependent bits are desirably preserved in the same locations in the reduced opcode set to the extent possible. This defines a subset D within Subset A for which the essential bit definitions in the opcodes are fixed, and whose other bits can be pseudo randomly filled with 0's or 1's without overlap. The hardware blocks that rely on certain bits in certain positions in the opcode will still see the same instruction regardless of the other bits and the only thing that needs to be modified for these opcodes is the PLA. Since different possible combinations of the pseudo random bits will produce different PLA sizes, those combinations which minimize PLA size are preferred.

It will be apparent to those of skill in the art based on the description herein that the present invention permits a significant reduction in die area and therefore in die cost by optimizing the ROM and PLA space on the die to suit the needs of the particular, internally stored, application program that the die is intended to run. This is especially important in applications, such as for example, cellular phones and other consumer appliances, where the DSP uses stored internal programs to carry out its functions. Examples of such stored programs are CODEC, encryption and formatting functions in communication devices and washing, drying, cooking and other temperature control and speed control cycles in various consumer appliances. Since very large numbers of chips are used in such applications, total area savings of even a few percent are very significant and more than justify the extra cost of the special mask set needed to implement the shrunk ROM and PLA functions in the semiconductor die.

While the present invention has been described in terms of certain examples and applications, this is merely for convenience of explanation and not intended to be limiting. Those of skill in the art will understand based on the description herein that other combinations and arrangements can also be used. Accordingly, it is intended to include such variations and alternatives as fall within the scope of the claims that follow.

What is claimed is:

1. A method for making a processor for which a basic instruction set C has been previously defined, so that it can run an internally stored application program using only a subset A of the basic instruction set C, comprising the steps of:

analyzing the application program to identify a number #OC of opcodes in the subset A;

determine a minimum opcode bit length M required to code #OC for internal storage, where M is the smallest integer satisfying the relationship $2^M \geq$ #OC;

selecting a new opcode length M'>M such that the total chip area occupied by the processor is minimized;

establishing (i) a memory for storing new opcodes implementing the instruction subset A with opcode of length M', and (ii) an opcode interpreter to interpret the new opcodes so as to operate the processor in accordance with the application program; and storing the new opcodes in the memory coupled to the opcode interpreter.

2. The method of claim 1 wherein M'=n×N and n and N satisfy the relationship $((n-1) \times N) < M < (n \times N)$ where N is a unit bit length in the processor for handling instructions or data and n is an integer.

3. The method of claims 1 wherein the establishing steps comprise programming a read only memory (ROM) to store the new opcodes and modifying a PLA able to interpret opcodes based on the instruction set C to interpret the new opcodes which substantially use only instruction subset A.

4. The method of claim 1 wherein M=12 and M'=16.

5. A DSP comprising a ROM storing a sequence of opcodes defining steps in a stored program using #OC unique opcodes, and having an opcode interpreter to recognize the opcodes stored in the ROM, wherein the opcodes stored in the ROM are a subset A of DSP instruction set C, wherein M is the smallest integer satisfying the relationship $2^M >$ #OC, wherein the ROM contains opcodes of bit length M'=n×N, wherein n and N satisfy the relationship $((n-1) \times N) \leq M < (n \times N)$ where N is a unit bit length in the DSP for handling instructions or data and n is an integer.

6. The DSP of claim 5 wherein the opcode interpreter is a PLA.

7. The DSP of claim 5 wherein M=12 and M'=16.

8. A processor chip comprising a ROM storing a sequence of opcodes defining steps in a stored program using #OC unique opcodes, and having an opcode interpreter to recognize the opcodes stored in the ROM, wherein the opcodes stored in the ROM are a subset A of DSP instruction set C, wherein M is the smallest integer satisfying the relationship $2^M >$ #OC, wherein the ROM contains opcodes of bit length M'>M where M' is chosen so as to minimize the total area of ROM plus PLA.

9. The DSP of claim 8 wherein the opcode interpreter is a PLA.

10. The DSP of claim 8 wherein the total area includes the whole processor chip area.

* * * * *